R. E. BATES.
SHOCK ABSORBER.
APPLICATION FILED OCT. 9, 1914.

1,184,668.

Patented May 23, 1916.

Witnesses
Ralph W Nagel
Jos. S. Dehmng

Inventor
R. E. Bates.
By
Chas. N. Butler
Attorney

UNITED STATES PATENT OFFICE.

RALPH E. BATES, OF PHILADELPHIA, PENNSYLVANIA, ASSIGNOR TO RALPH W. NAZEL, OF PHILADELPHIA, PENNSYLVANIA.

SHOCK-ABSORBER.

1,184,668.  Specification of Letters Patent.  Patented May 23, 1916.

Application filed October 9, 1914. Serial No. 865,804.

*To all whom it may concern:*

Be it known that I, RALPH E. BATES, a citizen of the United States, residing in the city of Philadelphia, county of Philadelphia, and State of Pennsylvania, have invented certain Improvements in Shock-Absorbers, of which the following is a specification.

My invention is a shock absorber designed primarily for use on automobiles or motor vehicles, but it will be understood that it is adapted for general application.

My chief objects are to increase the resiliency of springs and to control the rebound. These ends are accomplished, in the preferred construction, by the use of a cylinder and piston connected by lever mechanism with springs, whereby the desired functions are performed in an efficient manner, the cylinder being provided with a spring and check valve for effecting pneumatic and mechanical control of the piston to obtain the desired results in the most efficient manner.

Characteristic improvements of my invention 1 side in the peculiar capacity thereof for ready application to existing constructions, the road clearance provided thereby, and the compactness and simplicity of the construction.

The invention is fully set forth in the following description and the accompanying drawings in illustration thereof.

Figure 1:
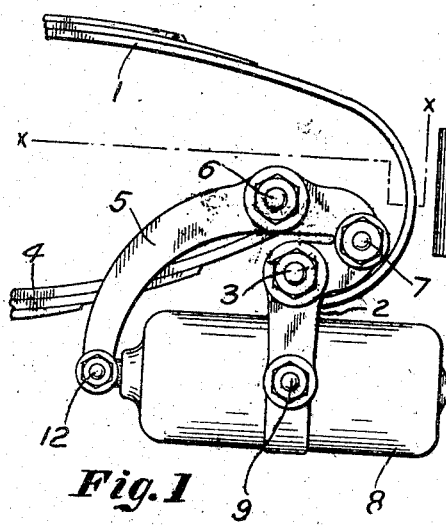
Figure 5:
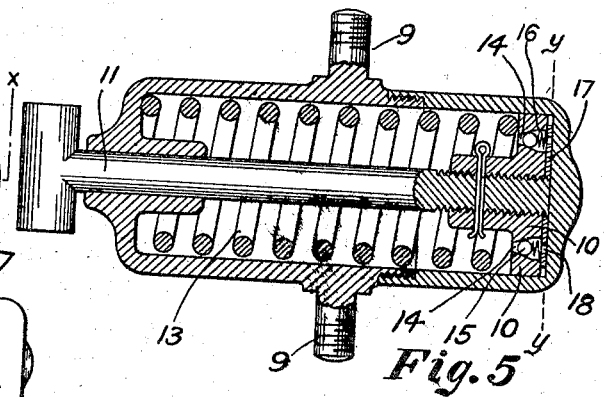
Figure 3:
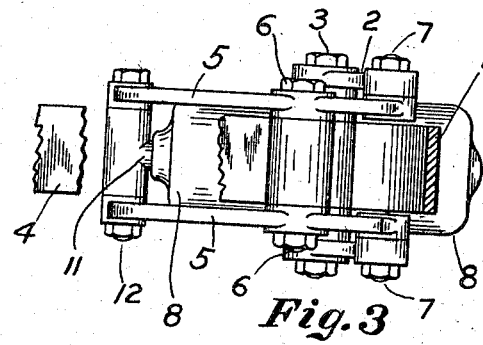
Figure 2:
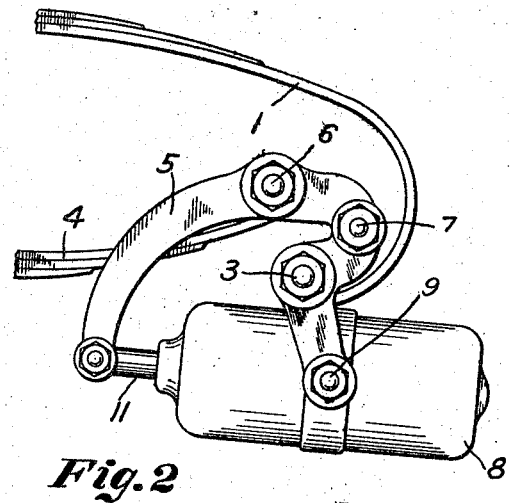
Figure 4:
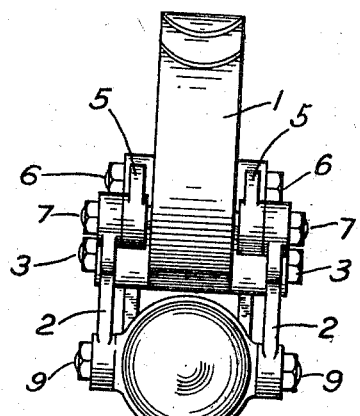
Figure 6:

In the drawings, Figure 1 is a side elevation of part of an elliptical spring having my invention applied thereto; Fig. 2 represents a compressed position of the construction shown in Fig. 1; Fig. 3 is a broken sectional view taken on the line $x$—$x$ of Fig. 1; Fig. 4 is an end elevation of the construction shown in Fig. 1; Fig. 5 is a longitudinal sectional view taken through the cylinder; and Fig. 6 is a sectional view taken on the line $y$—$y$ of Fig. 5.

The mechanism, as illustrated in the drawings, comprises the upper leaf spring 1 having the double crank lever 2 fulcrumed on the end thereof by the bolt 3, the lower leaf spring 4 having the double lever 5 fulcrumed on the end thereof by the bolt 6, the bolt or pintle 7 for flexibly connecting or hinging the levers together, the cylinder 8 pivotally mounted between similar arms of the double lever 2 by the trunnions 9, the piston 10 having the piston rod 11 pivotally connected to the lever 5 by the bolt or pintle 12, and the helical spring 13 disposed in the cylinder between the forward end thereof and the piston; the latter having the ports 14 controlled by the check valves 15 normally seated by the coiled springs 16 which rest on the piston's face plate 17 containing air passages 18 communicating with the ports 14 when the check valves are opened.

The load applied to the leaf spring 1 is communicated to the leaf spring 4 through the intermediate mechanism described, so that the piston 10 is moved in the cylinder 8 against the action of the spring 13 and simultaneously air flows from the front to the rear end of the cylinder through the ports 14 and 18, the pivoted relation of the parts providing entire flexibility of movement under the load or shock from the position shown in Fig. 1 to the position shown in Fig. 2. As the springs 1 and 4 separate upon the rebound, the mechanism returns gradually to the position shown in Fig. 1 from that shown in Fig. 2, by reason of the fact that the rearward movement of the piston is controlled by the air confined in the rear end of the cylinder by the check valves 15, the gradual escape of the air taking place at the desired rate around the piston.

The helical spring 13 is constructed so that it shall have approximately the same elasticity as the springs 1 and 4, hence the resultant elasticity is increased by that of the helical spring. The mounting of the cylinder, involving a principle analogous to that of the lazy tongs, provides an extended movement for the piston over that of the ends of the elliptical spring and permits a weaker elliptical spring to be used than would otherwise be practicable. The rebound is effectually controlled by the air cushion, the action of which can be regulated. The method of mounting is such that no alteration is required in the usual elliptical springs, nor does the shock absorber extend substantially below the same in any position of use, which are marked desideratum.

Having described my invention, I claim:

1. The combination of a pair of members adapted to move relatively, with a shock absorber comprising a lever fulcrumed intermediate its length on one of said members, a lever fulcrumed intermediate its length on the other of said members, means for pivotally connecting ends of the respective levers, and means comprising a cylinder and piston connecting the opposite ends of said levers, said cylinder being supported intermediate of its length.

2. The combination of a pair of members, with a shock absorber comprising a bent lever fulcrumed intermediate of its length on one of said members, a bent lever fulcrumed intermediate of its length on the other of said members, means for pivotally connecting corresponding ends of said levers, a pneumatic cylinder and a piston therein respectively connected with the other ends of said levers, so that said cylinder is supported in an approximately horizontal position, and a spring disposed in said cylinder so as to oppose the movement of said piston when either of said members is moved toward the other.

3. The combination of a pair of springs, with a shock absorber comprising levers fulcrumed on the respective springs, means for connecting said levers in rocking relation, and means comprising a cylinder having trunnions connected with one of said levers and a piston connected with the other of said levers so that said cylinder is disposed substantially horizontally.

In testimony whereof I have hereunto set my name this 7th day of October, 1914, in the presence of the subscribing witnesses.

RALPH E. BATES.

Witnesses:
 RALPH W. NAZEL,
 JOS. G. DENNY, Jr.